US012548301B2

(12) United States Patent
Mill (10) Patent No.: US 12,548,301 B2
(45) Date of Patent: Feb. 10, 2026

(54) COMPUTER-IMPLEMENTED METHOD FOR GENERATING SYNTHETIC IMAGES FOR TRAINING ARTIFICIAL INTELLIGENCE (AI)

(71) Applicant: MIRA VISION HOLDING GMBH, Wangen (DE)

(72) Inventor: Leonid Mill, Munich (DE)

(73) Assignee: Mira Vision Holding GmbH, Wangen (DE)

( * ) Notice: Subject to any disclaimer, the term of this patent is extended or adjusted under 35 U.S.C. 154(b) by 177 days.

(21) Appl. No.: 18/702,036

(22) PCT Filed: Oct. 13, 2022

(86) PCT No.: PCT/EP2022/078584
§ 371 (c)(1),
(2) Date: Apr. 17, 2024

(87) PCT Pub. No.: WO2023/066792
PCT Pub. Date: Apr. 27, 2023

(65) Prior Publication Data
US 2025/0014317 A1   Jan. 9, 2025

(30) Foreign Application Priority Data
Oct. 18, 2021 (DE) .......................... 102021126965.2

(51) Int. Cl.
*G06V 10/774* (2022.01)
*G06T 11/00* (2006.01)
*G06V 20/69* (2022.01)

(52) U.S. Cl.
CPC .......... *G06V 10/774* (2022.01); *G06T 11/001* (2013.01); *G06V 20/695* (2022.01)

(58) Field of Classification Search
CPC ................ G06V 10/774; G06V 20/695; G06T 11/001; G06T 2207/20081; G06T 2207/20084; G06T 2207/30024; G06T 11/00
See application file for complete search history.

(56) References Cited

U.S. PATENT DOCUMENTS

2017/0236013 A1   8/2017   Clayton et al.
2021/0249118 A1*  8/2021   Papagiannakis ....... G16H 50/30
(Continued)

FOREIGN PATENT DOCUMENTS

DE   102017208994 A1   11/2018
DE   102020117376 A1   1/2021

OTHER PUBLICATIONS

International Patentability Examination Report for corresponding International Patent Application No. PCT/EP2022/078584 dated Sep. 4, 2023.
L. Mill et al., "Synthetic Image Rendering Solves Annotation Problem in Deep Learning Nanoparticle Segmentation" Nov. 20, 2020.

(Continued)

*Primary Examiner* — Jitesh Patel
(74) *Attorney, Agent, or Firm* — Greer, Burns & Crain, Ltd.

(57) ABSTRACT

A method for generating synthetic images of a biological material and a sample solution for training an artificial intelligence (AI) by: generating a base data set comprising image and coordinate data, feeding the base data set to a pipeline of conversion nodes, each comprising a parametric algorithm to generate a subsequent image dataset by changing or adding a feature of the image dataset, each parametric algorithm comprising a parameter to be varied within a range of values to control the change of the feature during the conversion, wherein, each subsequent image data set in (Continued)

the pipeline is sequentially fed to a plurality of conversion nodes to generate a final image data set representing the synthetic image, and generating the sample solution with a further algorithm for the final image data set or a subsequent image data set preceding the final image data set in the pipeline.

8 Claims, 7 Drawing Sheets

(56) References Cited

U.S. PATENT DOCUMENTS

| | | | | |
|---|---|---|---|---|
| 2021/0279866 | A1* | 9/2021 | Svekolkin | G06T 7/11 |
| 2022/0309653 | A1* | 9/2022 | Hassanpour | G06V 10/82 |
| 2023/0320611 | A1* | 10/2023 | Wang | G01R 33/56536 |
| | | | | 382/128 |

OTHER PUBLICATIONS

International Search Report for corresponding International Patent Application No. PCT/EP2022/078584 dated Feb. 10, 2023.
P. Trampert et al., "Deep Neural Networks for Analysis of Microscopy Images—Synthetic Data Generation and Adaptive Sampling" Mar. 5, 2021.
P. Malm et al., "Simulation of Bright-Field Microscopy Images Depicting Pap-Smear Specimen" Jan. 8, 2015.
M. Kozubek "When Deep Learning Meets Cell Image Synthesis" Dec. 30, 2019.
A. Stergiou et al., "Traffic Sign Recognition based on Synthesised Training Data" Jul. 27, 2018.
I. Siniosoglou, et al., Synthetic Traffic Signs Dataset for Traffic Sign Detection and Recognition in Distributed Smart Systems Jul. 14, 2021.
International Patentability Examination Report for corresponding International Patent Application No. PCT/EP2022/078584 completed Dec. 18, 2023.

* cited by examiner

(i) (ii) (iii) (iv)

Fig. 7

COMPUTER-IMPLEMENTED METHOD FOR GENERATING SYNTHETIC IMAGES FOR TRAINING ARTIFICIAL INTELLIGENCE (AI)

CROSS-REFERENCES TO RELATED APPLICATIONS

This application claims the benefit of International Application Number PCT/EP2022/078584 filed on Oct. 13, 2022, and of the German patent application No. 10 2021 126 965.2 filed on Oct. 18, 2021, the entire disclosures of which is incorporated herein by way of reference.

FIELD OF THE INVENTION

The invention relates to a computer-implemented method for generating synthetic images for training artificial intelligence (AI) and a computer program with program code for carrying out the method.

BACKGROUND OF THE INVENTION

Image recognition is used in many technical fields to extract relevant information from an image and process it further. Examples are handwriting recognition, facial recognition, quality control in industrial production processes, the detection and evaluation of different traffic situations in vehicle assistance systems, but also the evaluation of the results of imaging diagnostics and microscopic images of tissue sections, cell cultures, smears and other biological materials in medicine.

In order to obtain the desired information from an image, certain features must be identified and extracted, while other image information is neglected. A challenging task in image analysis is to distinguish between the specific features of interest and irrelevant or "background" image information. A particular challenge in this context is the identification and differentiation of features of interest that are not constant in appearance in the real image, but can vary in many ways, e.g. in terms of size, shape, number, color, arrangement in relation to other features, etc., but which nevertheless belong to the same class of features of interest.

An example is the examination of medical or biological samples, for example microscopic images such as cell culture images or tissue sections from clinical sources for pathological diagnosis or histological examination. Such samples of natural origin can vary greatly depending on the sample type, sampling, preparation, pathological condition, but also due to the natural range of variation even in the same sample type.

Due to their cognitive abilities, humans are particularly predestined for "manual" image recognition and analysis. Nevertheless, human image recognition requires training and experience in many cases, is subjective, error-prone and time and resource consuming. Therefore, "manual" image evaluation is unsuitable in many cases when a reliable high throughput is required for the analysis of large amounts of image data or real-time image recognition. Automated, fast and reliable computerized image recognition and analysis is desirable.

The state of the art in computer-aided image analysis solutions includes artificial intelligence (AI) methods based on machine learning (ML), in particular deep learning techniques that use artificial neural networks (ANN). When the term artificial intelligence (AI) is used here, it refers to machine learning (ML) methods, preferably deep learning.

The currently most commonly used variant for training an AI is supervised learning. This involves training the AI on one or more specific goals or tasks using training data. The AI is therefore presented with combinations of training images and the associated result on which the AI is to be trained, i.e. a sample solution ("labels", "annotations", "ground truth") for the task to be solved using the images. This combination of training images and sample solutions enables the AI to learn the task assigned to it, check and correct its results and thus undergo successful training.

The tasks on which an AI can be trained in the field of image analysis can be varied, although the process is generally always based on classification, in which the AI assigns different structures within the image data it receives to predefined classes. The assignment of a class is based on the sample solutions of the training image data, which already contain the classification of the training image data and with which the system was trained in advance.

In order to train such AI systems for image recognition and evaluation, many training images including the sample solutions ("labels", "annotations") are required, which are representative for the respective feature recognition task. The more complex and diverse the real images in the area of interest are, the more training data is required for the AI to achieve good results, such as in the image analysis of medical or biological samples. In many applications, the AI training images are based on real images, and the sample solution must be created manually with considerable human effort by first correctly classifying and marking the relevant features, so-called "labels" or "annotations". This makes the provision of training data costly and time-consuming. It is also prone to errors and highly subjective.

Figure 1:
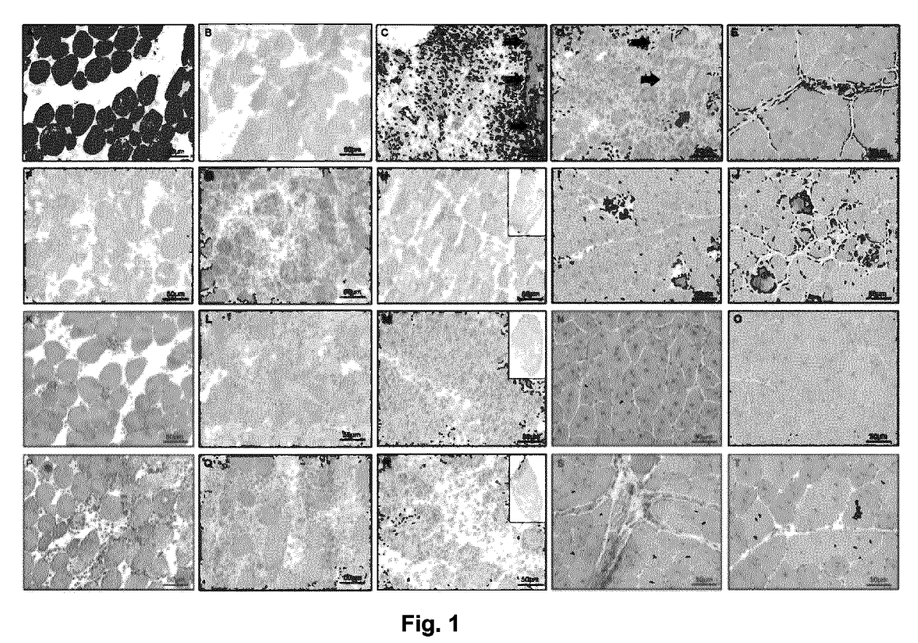
FIG. 1 shows microscopic brightfield images of hematoxylin and eosin (H&E) stained muscle tissue sections (here scaled in gray).

As an example of the complexity of biomedical microscopy images, FIG. 1 shows light microscopy brightfield images of hematoxylin and eosin (H&E) stained and FFPE-prepared (FFPE=formalin-fixed and paraffin-embedded) muscle tissue sections (here scaled in gray), which illustrate the variety of biomedical images for an exemplary selected tissue type. Due to the diversity of cell and tissue types, today's modern AI-based image analysis solutions in diagnostic and biomedical imaging are highly specialized and require large amounts of training datasets from clinical sources. Providing meaningful training images and manually processing them through annotation to obtain corresponding sample solutions remains a key problem for training AI.

Figure 2:
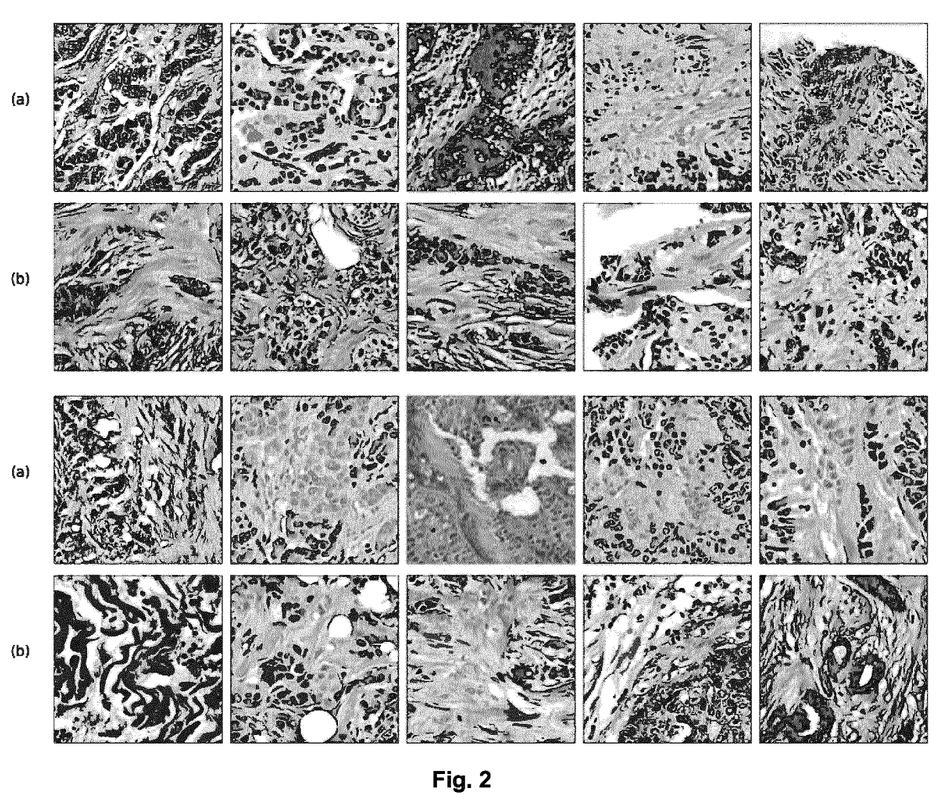
FIG. 2 shows synthetic (a) vs. real (b) H&E stained breast cancer tissue images, where the synthetic images were generated by PathologyGAN (here scaled in gray).
Figure 3:
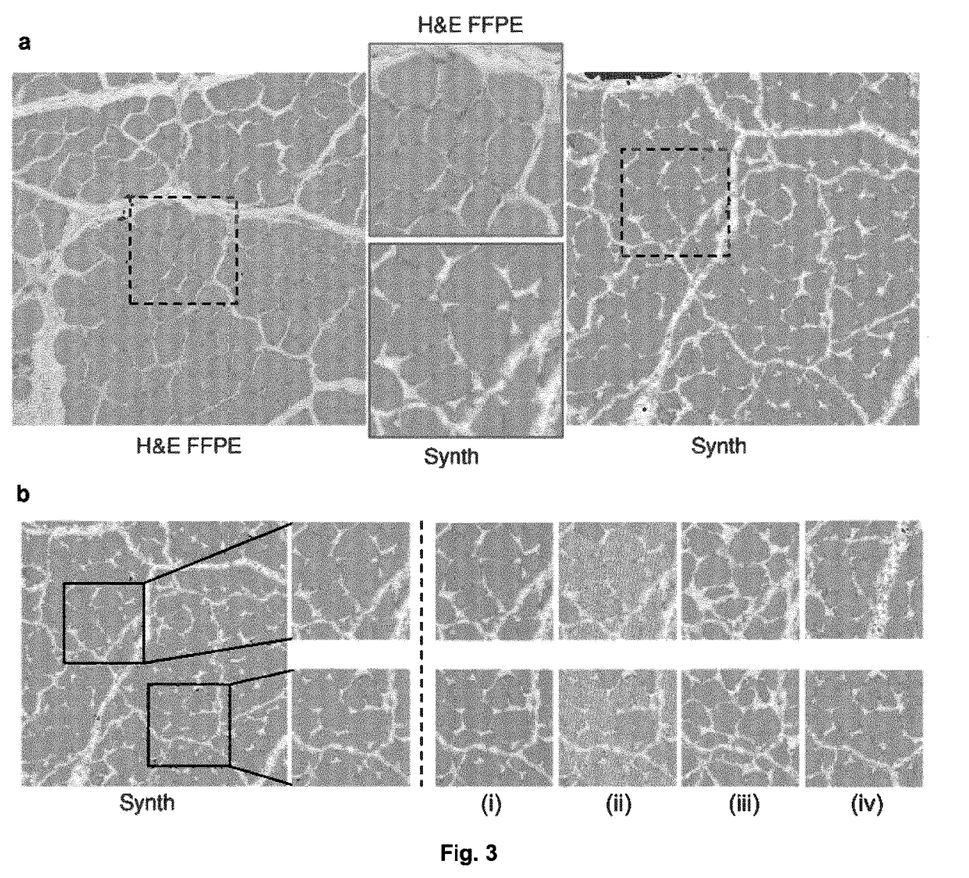
FIG. 3a shows a real microscopic brightfield image of H&E-stained and FFPE-prepared skeletal muscle fibers ("H&E FFPE") on the left compared to a synthetic image ("Synth") generated by the method of the present invention on the right (here scaled in gray). Enlarged sections of the areas represented by broken lines in the respective images are shown in the center.
FIG. 3b shows, to the left of the broken line, the synthetic microscopic brightfield image from FIG. 3a ("Synth") generated by the method of the present invention as well as enlarged sections thereof and, to the right of the broken line, differently processed variants of the respective enlarged sections: (i)=variation of the staining; (ii) superimposition or additions in the form of line-shaped section artefacts. (iii) variation of the fiber shapes (compared to the original sections, the fibers have a more degenerated and complex geometric shape); (iv) variation of the connective tissue and the cell nuclei (compared to the original sections, there are more and larger cell nuclei and the coarse connective tissue has a different size and is positioned differently).

Given the problem of providing a sufficiently large number of suitable training images derived from real image sources, several approaches have been proposed for generating more or less realistic synthetic images. Among the most successful are the so-called Generative Adversarial Networks (GANs), which are able to generate realistic-looking synthetic images of high quality when trained with large amounts of unlabeled (non-annotated) data. In this context, a method called PathologyGAN has been proposed that can generate realistic-appearing images of H&E-stained breast cancer tissue. FIG. 2 (a) shows H&E breast cancer tissue images synthetically generated with PathologyGAN (here scaled in gray) in direct comparison to real images in FIG. 2 (b). Although the generated images are of high quality, appear very realistic and contain various features (tissue, nuclei, cells) that are also present in real images, the use of GAN technology to solve the data problem is still very limited for several reasons. GANs are based on deep artificial neural networks (DNN), which are considered black boxes due to the poor interpretability of their internal structure and it is therefore not possible to precisely control GANs to achieve a specific and desired result. In addition, large amounts of real image data are required for training GANs, which in turn is associated with the problem of providing such real images described above. Finally, GANs do not provide sample solutions ("labels", "annotations", "ground truth") as required for supervised learning of AI systems for quantitative image analysis.

SUMMARY OF THE INVENTION

The object of the present invention was therefore to provide a method and a system which overcomes the disadvantages of the methods of the prior art and generates synthetic training data for the supervised learning of AI systems in a controllable and efficient manner, in particular synthetic training data of microscopic images comprising cells or other biological material.

BRIEF DESCRIPTION OF THE DRAWINGS

FIG. 7 shows at (i) in the top row a real microscopic brightfield image of H&E-stained and FFPE-prepared skeletal muscle fibers and below a detail enlargement of the area shown in the top image by a broken line (here scaled in gray). The images at (ii), (iii) and (iv) show corresponding binary segmentation masks in which fiber cross-sections are shown in white and the background (connective tissue, intercellular spaces, etc.) in black. The segmentation masks (ii) were generated by an AI, which was trained exclusively with real muscle fiber cross-section images and corresponding manually annotated segmentation masks as sample solutions, whereby the real cross-section image (i) is a test image for testing the AI, which was not among the training data. The segmentation masks (iii) were generated by an AI that was trained exclusively with muscle fiber section images and associated segmentation masks generated synthetically according to the present invention. The illustrations in (iv) show annotations of the real test image (i) performed manually by an expert. It can be seen that the segmentation generated by the AI trained exclusively with synthetically generated images is at least qualitatively equivalent to that generated by the AI trained exclusively with real images, while at least one cell was overlooked in the manual annotation performed by an expert.

DETAILED DESCRIPTION OF THE PREFERRED EMBODIMENTS

The problem of the present invention is solved by a computer-implemented method for generating synthetic images representing microscopic images of a biological material and, for each synthetic image, at least one sample solution for training an artificial intelligence (AI) comprising the steps of generating or providing a two-dimensional base image data set comprising image data and coordinate data of basic structures of biological material feeding the base image data set to a pipeline, i.e. a sequence of conversion nodes, each conversion node comprising a parametric algorithm designed to generate a subsequent image data set by changing or adding at least one feature of the image data set fed to the algorithm by converting the image data and/or coordinate data, wherein each parametric algorithm comprises at least one parameter which can be varied within a range of values in order to control the change of the feature in the supplied image data set during the conversion of the image data and/or coordinate data, and wherein, starting from the base image data set, each subsequent image data set in the pipeline (sequence) of conversion nodes is sequentially fed to further conversion nodes in order to generate a final image data set which represents a synthetic image of a microscopic image of a biological material, generating at least one sample solution by means of at least one further algorithm for the final image data set or a subsequent image data set preceding the final image data set in the pipeline.

Due to the pipeline of parametric algorithms according to the invention, which are applied to the image data sets, the method of the present invention is able and suitable to generate synthetic images which have the characteristics of the desired biological material and reproduce them in a photorealistic manner and are therefore indistinguishable or hardly distinguishable from real images. At the same time, the method for a synthetic image provides at least one sample solution for a task on which an AI can be trained using the combination of synthetic image and sample solution by means of "supervised learning".

In a preferred embodiment of the invention, the synthetic images generated according to the invention are those representing microscopic images of a biological material, such as images of muscle sections, tissue sections, vascular sections, bacteria, cell cultures, etc.

The method according to the invention has a number of advantages over known methods for providing training data for the supervised learning of AI systems. Unlike GANs, for example, the system does not require a large number of real images of the material of interest in order to generate a wide range of photorealistic images. This eliminates the effort of collecting and providing a large number of real images, for example from clinical sources. Since the functions of the parametric algorithms at the conversion nodes and the respective parameter values are known, a sample solution for an image data set suitable for training the AI on specific tasks can be generated directly in the pipeline in the method according to the invention. It is therefore not necessary to manually classify and annotate the generated synthetic training images in order to generate a sample solution (ground truth), which is required for the supervised learning of AI, as is necessary with real images or, for example, with synthetic images generated using GANs and involves a great deal of effort.

In the method according to the invention, a two-dimensional base image data set is generated or provided in a first step, which is fed to the pipeline of conversion nodes, in which it is then changed sequentially by the parametric algorithms by converting the image data and/or coordinate data. A subsequent image data set or a number of subsequent image data sets are generated by procedural generation. The result is a synthetic training image and at least one matching sample solution. The parametric algorithms are designed to modify certain features of the base image dataset or the subsequent image datasets in the pipeline in such a way that a final image dataset is obtained by procedural generation, which can represent a real image of the biological material of interest on which the AI is to be trained, for example a light microscopic image of a muscle fiber section, a smear or the like.

To achieve this goal, the base image dataset already includes image data and coordinate data of basic structures of the biological material of interest. Knowing the material of interest, it is easy for the person skilled in the art to include or implement such basic structures in the image data and coordinates of the base image data set. The base image data set can be generated manually or by means of algorithms, such as a Voronoi structure, which is suitable in the sense of the invention, for example, as a base image data set for generating synthetic images representing microscopic images of muscle cell sections or other cellular structures. Even simple basic geometric patterns, such as rectangles, ellipses, circles, etc., can provide a base image data set insofar as they imitate basic structures of the biological material of interest. The selection of a basic pattern for the generation of a base image data set results for the person skilled in the art from knowledge of the typical visual appearance of the biological material of interest, e.g. on the basis of real reference images. Another possibility for providing a base image data set is the use of known simulative methods, such as cellular automata or reaction diffusion, which are designed to simulate basic patterns of biological systems by means of simple laws.

On the basis of the base image data set used for a specific biological material of interest, the parametric algorithms used according to the invention generate subsequent image data sets at the conversion nodes of the pipeline and finally a final image data set representing a synthetic image of a microscopic image of the biological material of interest. The parametric algorithms are designed to apply regularities and patterns of the particular biological material of interest or how a sample typically appears (e.g. a stained microscopic section) during the conversion. Due to the procedural and parametric character of the simulation, synthetic images can also be generated that rarely or possibly never occur in the biological material of interest in reality, but this is harmless for training an AI.

Using the example of a muscle cell section, a base image data set comprises two-dimensional image data and coordinates of the basic cellular structures and their positions, such as the positions of cell nuclei, the extent of the cells around the nucleus up to the cell wall or the fiber boundaries and the distances between the cells. Surrounding tissue and tissue artifacts can also be taken into account in the image data and coordinates of the base image data set. Starting from the image data and coordinates of such a simple basic structure, which does not yet represent a realistic image of a muscle fiber section, the image data and coordinate data are changed and superimposed by the parametric algorithms at the conversion nodes, thus obtaining a final image data set that can correspond to a realistic image of a muscle fiber section.

Examples of changes and superimpositions at the conversion nodes include, for example, scaling, i.e. changes in the sizes of certain structures by converting their coordinates in two-dimensional space, e.g. changes in the sizes of the cells, the cell nuclei, the distances between the cells or the extent of the connective tissue between the individual cells.

When herein reference is made to changes and superimpositions of the image data and/or coordinate data of the base image data set or of subsequent image data sets, this therefore also includes the addition or superimposition of image and coordinate data of a parametrically generated further image in the sense of a mask, which comprises certain structures, shapes, colors, textures, etc. of the biological material of interest. For example, a pattern in the form of a mask that adds basic structures of coarse connective tissue, blood vessels, preparation artifacts, etc. can be added or superimposed on the image and coordinate data of an image data set that only contains basic patterns of simple cell structures arranged in two-dimensional space.

Each image point is already linked in the image and coordinate data of the base image data set, as well as in the subsequent image data sets generated at the conversion nodes, with information about its position in two-dimensional space, its color and also its class assignment (e.g. cell nucleus, fiber boundary, etc.). This image and coordinate data of each image point can be changed at the conversion nodes by the parametric algorithm used. Changes and overlays at the conversion nodes can also change the class assignment of an image point. For example, an image data set can initially only include data on certain structures or classes, e.g. only cell nuclei and fiber boundaries, and can be converted into a subsequent image data set that has one or more additional classes by superimposing data of a further class, e.g. connective tissue. Image points of a certain class can then be assigned a new class at the conversion nodes in addition to new color and coordinate information.

Further examples of changes concern the positions of the cells or certain structures in relation to each other defined by coordinates, whereby, for example, groupings, accumulations or clusters of cells can be displayed, which are separated from each other by connective tissue structures or the like, as also occurs in natural tissue. The positions of the cell nuclei or other organelles within the cells can also be changed.

Further changes to the conversion nodes concern, for example, different colorations and textures, which can be generated by varying certain color values, by introducing noise or by various overlays. In this context, parametric algorithms of the invention are also designed to perform randomizations in order to introduce randomized variations within predetermined ranges, for example in connection with textures. The smoothness or curvatures of certain structures can also be determined by the parametric algorithms, for example the smoothness or curvature of the cell wall in the cross-section of a cell or other interfaces.

For example, image data and coordinates of a Voronoi diagram represent a suitable and advantageous base image data set for a biological material with cellular structures according to the invention. The Voronoi diagram is generally known, inter alia, for modeling cellular and other biological structures, but also for simulations in many other fields. The creation of a Voronoi diagram is based on a number of points (seeds) that are distributed in a plane. Starting from these points, certain algorithms are used to generate areas in the plane, for example directly by applying the Fortune algorithm or indirectly, e.g. starting from a Delaunay triangulation, by determining their dual.

The image data and coordinates of such a Voronoi diagram are suitable to serve as a base image data set of a biological material comprising cells in the sense of the invention, wherein the starting points (seeds) of the Voronoi can represent cell nuclei and the areas developed around them can represent cross-sections of the cytoplasm and the cell walls and thus represent a basic structure for the biological material comprising cells of interest.

In one embodiment of the method according to the invention, a sample solution is generated using at least one further algorithm from the final image data set generated in a run through the pipeline. Alternatively or additionally, the sample solution can also be generated from a subsequent image data set preceding the final image data set in the pipeline. This is advantageous, for example, if the further conversions or changes to the subsequent image data set selected for this purpose up to the final image data set no longer have any influence on the sample solution, i.e. the sample solution for the selected subsequent image data set would be the same as for the final image data set. This can be the case, for example, if the sample solution refers to the arrangement, size or shape of certain cellular structures, such as cell nuclei, cell walls, etc., but the further conversions in the pipeline affect parameters that do not affect these features of the cellular structures. Such parameters can be, for example, the staining (e.g. H&E staining) of the simulated images used in real microscopy, certain characteristics of the connective tissue located between the cells, etc. Since the parametric algorithms and their sequence within the pipeline are known, it is easy to control whether or not conversion nodes between a particular subsequent image dataset and the final image dataset still have an influence on the sample solution, which in turn depends on the type of sample solution desired. In this way, many different appearing synthetic training images can be generated, for example with different colorations, textures, etc., but which all have the same sample solution, whereby the performance of the AI to be trained can be increased very efficiently compared to known methods. In previous methods, it was necessary to generate a separate sample solution for each training image, whether it was a real image or one generated synthetically using GANs, with a high level of annotation effort.

In a preferred embodiment of the invention, sample solutions are segmentation masks. A segmentation mask is an image derived from the synthetic training image or from the generated image data set, in which certain structures of interest of one class are represented by a defined color or class index and possibly other structures of interest of another class are represented by a different color or class index. By segmenting certain structures in a real or real-appearing synthetic image, the AI can learn to identify and evaluate such structures in images during training together with the sample solution. Different colors in segmentation masks are primarily used for visual representation. To train an AI, it is sufficient if each pixel is assigned a value representing the class as a class index instead of a color, e.g. background pixel: 0, fiber pixel: 1, connective tissue: 2, etc. When this refers to the colors of the segmentation mask, this also includes the use of class indices.

Using the example of the microscopic section of muscle fibers, structures of interest can be, for example, the muscle fiber itself, cell nuclei and blood vessels or connective tissue structures, each representing a separate class. In a segmentation mask, these structures or classes can then be shown in different colors and the background in another color. Simple (binary) segmentation masks only show one structure or class of interest in a specific color and the rest as a background in another color.

Figure 6:
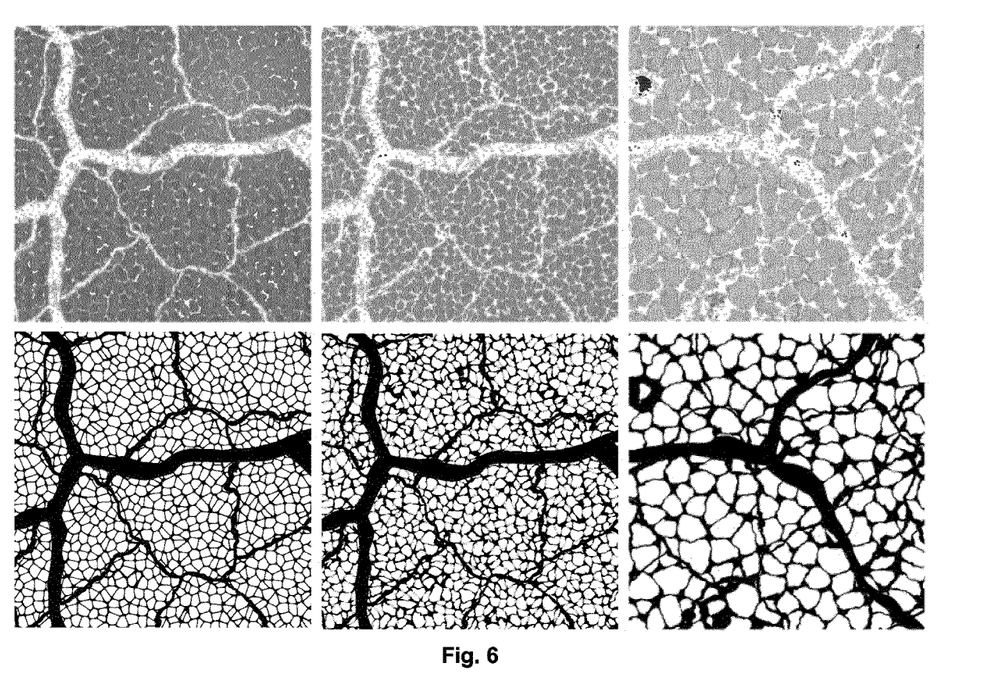
FIG. 6 shows in the top row synthetic photorealistic images of muscle fibers from FIG. 5 (here scaled in gray) and in the bottom row their respective synthetically generated (here binary) segmentation masks, which serve as sample solutions for training an AI system on the segmentation of muscle fiber images.
Figure 7:
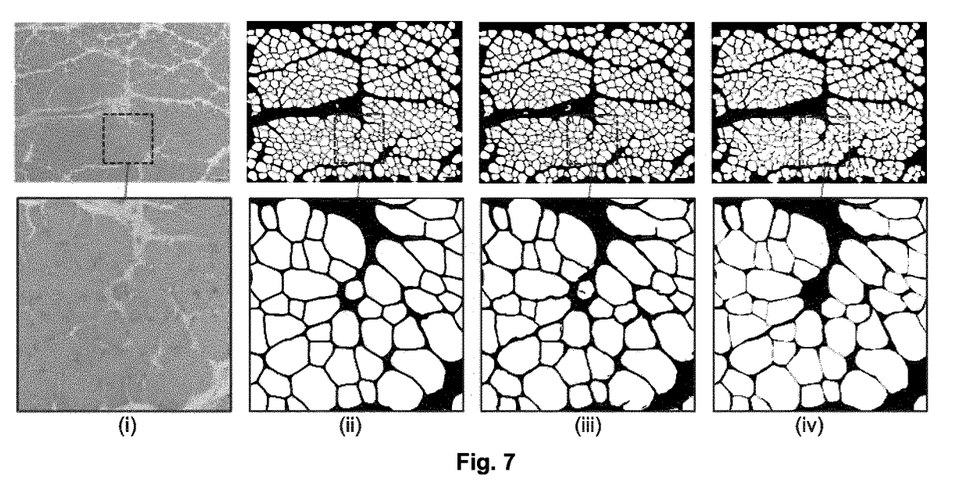

FIG. 6 shows an example of training images and associated segmentation masks, where the top row shows photorealistic synthetic images of muscle fibers (here scaled in gray) generated using the method according to the invention and the bottom row shows associated binary segmentation masks, where only the cross-sections of the muscle fiber cells as a whole are shown as the structure or class of interest in white and all other structures are shown as the background in black. With the synthetic images of muscle fiber sections shown here and the associated segmentation masks as sample solutions, an AI can be trained, for example, to analyze real light microscopic images of muscle fiber sections with regard to the cross-sections of the muscle fiber cells and to generate corresponding solutions or segmentations from them. These solutions or segmentations can then be used to perform a wide variety of evaluations, such as determining the number of muscle fibers per area, their diameters or cross-sectional areas, their shapes or length-to-width ratios, the distances between them, the clustering of muscle fiber cells, etc. Depending on the intended task of the AI to be trained, additional segmentation masks or segmentation masks based on other features can be generated as sample solutions, e.g. by segmenting other cellular structures such as cell nuclei, cell organelles, etc., or structures of the connective tissue between the cells. As explained above, different features or structures or classes of interest can also be marked simultaneously within a segmentation mask using different colors.

Since segmentation masks are pixel-precise classifications of the structures of an image, an AI can be trained in conjunction with the associated realistic training image, whether obtained from a real sample or generated synthetically, to assign each individual pixel to a class and then apply this to a real image, from which statistical or other information can in turn be derived. This information can then be used, for example, to identify pathological conditions or to determine the influence of diseases, drugs, environmental influences or medical treatment methods on certain biological materials or organisms.

In muscle pathology, for example, the percentage of cell nuclei arranged centrally versus decentrally in the cross-section of the muscle fibers is considered an indicator of certain pathological conditions of the examined tissue. The manual microscopic examination and evaluation of muscle cell sections with regard to, for example, the position of the cell nuclei in the fibers is extremely time-consuming, labor-intensive and inaccurate. An AI trained using appropriately designed segmentation masks can perform this task much more effectively and accurately. Furthermore, such AI-supported evaluations can also provide relevant statistical information due to the high throughputs of very many samples that can be achieved.

In addition to segmentation masks, the present invention also comprises other forms of sample solutions, depending on the type of task on which an AI is to be trained. Since the sample solution is generated from the existing and thus known image data and coordinates of the structures of the biological material, only the x-y positions of the muscle fiber centers or the cell nuclei, for example, can be extracted as sample solutions-again using the example of muscle slices. In this case, the sample solution would not be a segmentation mask, but a list of vector coordinates that is fed to the AI during supervised learning together with the associated training image.

Another example would be, if one wants to train an AI to this, to subsequently sharpen blurred or out-of-focus images of biological material, e.g. muscle fibers. In this case, the sample solution would be a sharp image generated using the method according to the invention, while the associated training image would be an image derived from this and blurred using appropriate algorithms (filters).

Similarly, an AI can be trained to convert low-resolution images into high-resolution images in order to emphasize fine structures without having to take real low- and high-resolution image pairs to train the AI. In this case, the sample solution would be a high-resolution image generated according to the method of the invention, while the corresponding training image would be an image derived from it with a reduced resolution generated by corresponding algorithms.

In the method according to the invention, a pass of a base image dataset through the pipeline of conversion nodes first generates a final image dataset and at least one associated sample solution. Since as many training images with respective sample solutions as possible are required for training an AI, it is expedient to carry out the method according to the invention for generating a plurality of different synthetic images and associated sample solutions several times from feeding the base image data set to the pipeline of conversion nodes until the final image data set is obtained, while changing the parameters of the parametric algorithms at the conversion nodes. Advantageously, the method according to the invention can thus provide a large number of training data sets for training an AI very effectively and essentially only depending on the available computing power of the system used in a very short time.

Varying the parameters of the parametric algorithms at the conversion nodes can be automated by means of corresponding loops that run through the respective parameter ranges.

In one embodiment of the method according to the invention for generating a plurality of different synthetic images and associated sample solutions, at least one subsequent image data set generated in the pipeline of conversion nodes is stored in an intermediate data memory and the same subsequent image data set is then fed several times to further conversion nodes, which are arranged in the pipeline (sequence) downstream of the conversion node at which the subsequent image data set stored in the intermediate data memory was generated, changing the parameters of the parametric algorithms at these conversion nodes.

In this way, considerable computing power can be saved in the system and the permutation of the parameters of the parametric algorithms at the conversion nodes can be made even more effective by only starting the parameter variation from an intermediate stage in order to generate different images. The computing power required for the conversion from the base image data set to the subsequent image data set generated at the intermediate stage is initially only required once. If sufficient different data sets have been generated from the subsequent image data set stored at the intermediate stage by subsequent parameter variation, a further variation by changing one or more parameters at preceding conversion nodes can again lead to a new subsequent image data set, which in turn is temporarily stored and fed to further conversion nodes several times in the same way.

In a further embodiment, several intermediate data memories are provided in the pipeline of conversion nodes, in each of which subsequent image data sets are stored and fed several times to downstream conversion nodes by changing the parameters of the parametric algorithms at these conversion nodes.

In a preferred embodiment, the method according to the invention is provided for generating synthetic training images and associated sample solutions in order to train an AI on images of a specific sample type for the analysis of which the AI is to be provided. The term "sample type" in this context refers to microscopic images of a specific biological material, for example a specific tissue type, cell type or a smear taken from a specific location. Examples of sample types would be the microscopic sections of muscle cells already mentioned several times, but also skin cells, nerve cells or images of cultured cells of a certain type, etc. In this variant of the method according to the invention, the AI is not intended to recognize a specific sample type, e.g. muscle cells, as such and to distinguish it from another sample type, e.g. nerve cells. Rather, in this variant, the AI should be trained and intended to be presented exclusively with samples of a certain type, e.g. real images of muscle cell sections, in order to analyze them with regard to certain features and structures.

If, for example, the AI is designed and trained to analyze microscopic sections of muscle cells in order to determine certain characteristics of a real sample, for example the number, density, arrangement, size, etc. of the muscle cells in a sample, it is not essential according to the invention that each individual synthetic image generated according to the invention for training the AI has a phenotype as it has actually already been observed or can actually occur in reality. A decisive aspect and advantage of the invention is that by parameterizing the image generation at the conversion nodes in accordance with the invention, synthetic images and associated sample solutions can also be generated that could occur in reality, even if they have never or only rarely been observed to date. This enables the AI to learn and recognize such a broad spectrum of possible characteristics of a certain sample type that was not possible using previously known methods or even training based on real and manually marked images, or would only be possible with an extremely high expenditure of resources. Since the AI in this case is intended to analyze only a specific sample type, for example only microscopic sections of muscle cells, it is not detrimental to the performance of the AI if the training data includes data that cannot occur in reality. The parameter ranges of each individual parametric algorithm of the conversion nodes in the pipeline according to the invention can therefore be selected so broadly that rare or very unlikely constellations are also generated, without it being critical if a parameter limit value falls into a range that no longer generates a possible characteristic of the respective sample type in reality. It is crucial that the AI is trained to recognize and analyze both frequent and rare or unlikely characteristics.

Using the example of the sample type of muscle cell sections, conversion nodes are provided, for example, to vary the coordinates of the cells in the plane and thus their distances from each other by parameterizing between very small and large distances, as also occurs in real samples. In reality, the smallest distance between neighboring muscle cells would be the direct contact of the cells, corresponding to a certain parameter limit value of the cell coordinates. If the parameter limit value is exceeded or not reached, depending on other parameters, such as the cell diameter, etc., the synthetically generated image may show an overlap that does not occur in reality. However, such extreme value overlaps are harmless for the training of the AI if the AI is intended for the recognition and analysis of only one specific sample type, in this case muscle cell sections, since in this case it is important that the AI can perform the trained solution, e.g. a segmentation, using a real image of the specified sample type. The AI does not have to distinguish the intended sample type from another sample type.

The determination of the ranges or limit values of the parameters of the individual conversion nodes therefore does not require exact knowledge of every real possible constellation, but can be set by the skilled person in plausible ranges on the basis of their specialist knowledge, without exceeding the limit value having a detrimental effect on the training of an AI. On the contrary, wide parameter ranges allow the generation of synthetic images of rarely or previously unobserved phenotype constellations of a particular sample type. The broader the range of training data for the AI, the better it will be able to generalize in the application.

The so-called "procedural generation" technique used in the present invention thus uses a pipeline of parametric algorithms to generate textures, patterns, shapes and coordinates of biological structures in a controllable manner. The parameterization of the algorithms allows features to be varied within predefined ranges in order to change and control aspects of the image data set subjected to the algorithm. Each change to a parameter leads to the generation of a new synthetic image dataset, whereby the variation of even a single parameter within the predefined range provides a large number of image datasets that are suitable as a basis for training AI. The variation of several or all parameters in several or all algorithms within the pipeline enables the generation of an almost infinite number of synthetic training images and associated sample solutions for the training of AI. Thus, the present invention makes it possible to replace the previously extremely time-consuming, resource-intensive and error-prone generation of training data by manual annotation of representative real images.

For example, if the number of parameters of the system is n and the number of different values that each parameter can take is m, the number of permutations, i.e. the number of different synthetic training images, would be $m^n$. In a scenario with (only) n=10 and m=10, the number of training data sets that can be generated to train an AI is therefore 10 billion. It would take generations of human lives to manually collect and annotate this number of real images. Although computer-aided image generation also takes time, depending on the available computing power, the invention therefore enables much faster, more effective and more reliable generation of training data for AI.

Figure 4:
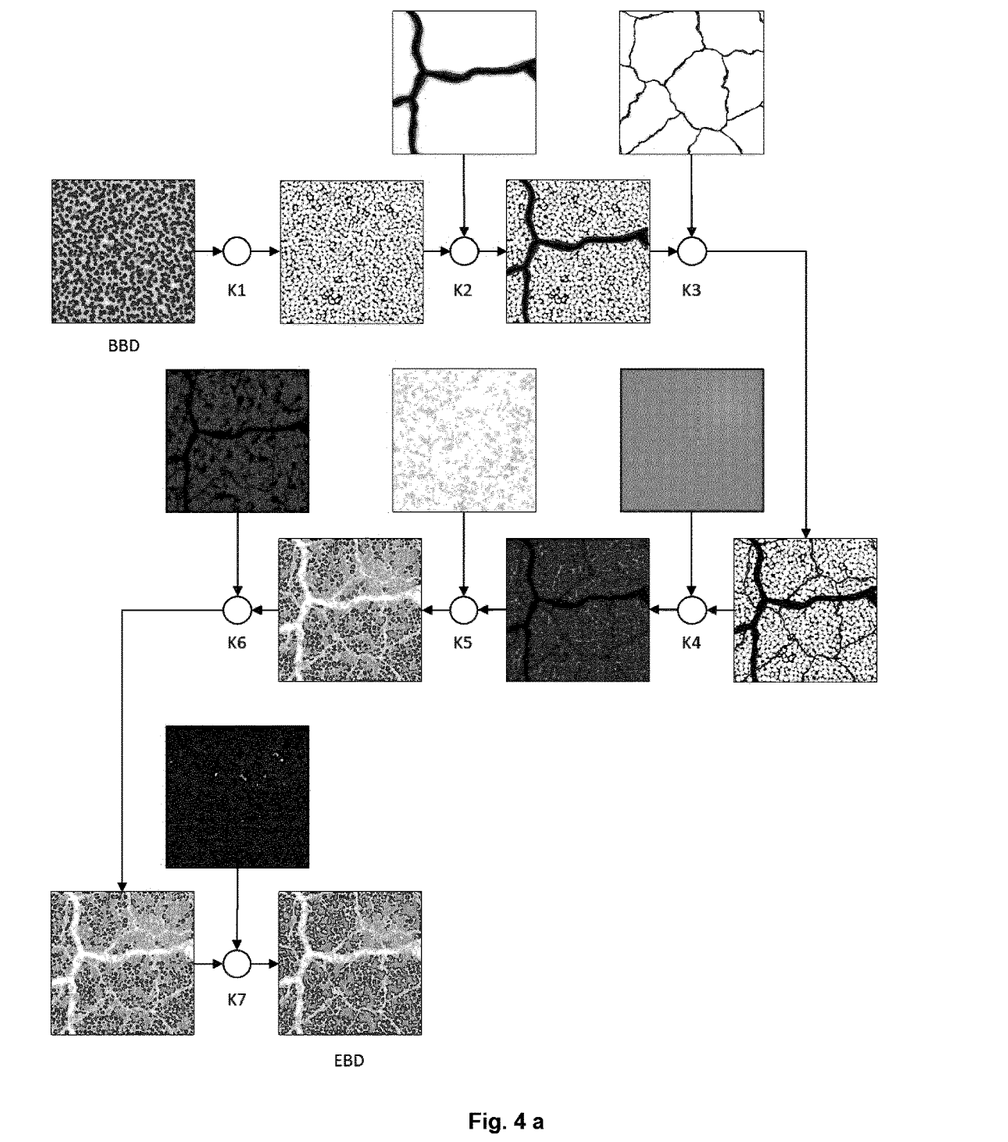
FIG. 4a shows an example of the procedural generation of a final image data set (EBD) of a synthetic bright field image of H&E-stained muscle fibers according to the method of the present invention, starting from a base image data set (BBD) via a pipeline of conversion nodes (K1, K2, K3 . . . ), including the bright field images of the subsequent image data sets generated at the conversion nodes.
FIG. 4b shows examples of three different segmentation masks as possible sample solutions of different classes of the final image data set (EBD) from FIG. 4a: (i) binary segmentation mask of muscle fibers; (ii) binary segmentation mask of coarse connective tissue; (iii) binary segmentation mask of cell nuclei.
Figure 5:
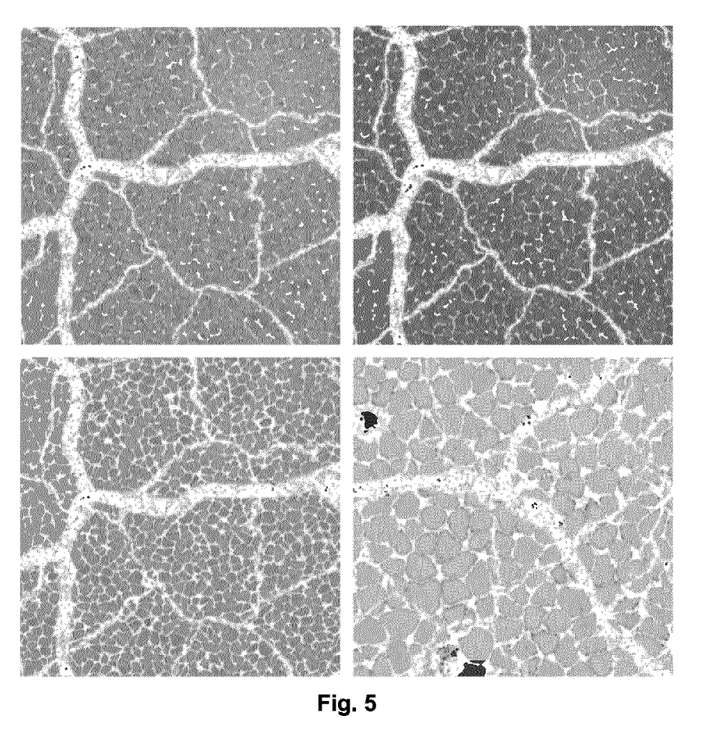
FIG. 5 shows synthetic but photorealistic brightfield images (here scaled in gray) of H&E-stained skeletal muscle fibers generated using a procedural pipeline according to the present invention. With the method according to the invention, it is possible to automatically modify and control various aspects of the image while preserving the inherent muscle fiber pattern. While the two upper images in FIG. 5 show different characteristics of the H&E staining, the two lower images in Figure show adapted fiber shapes, sizes and distributions by changing only individual parameters of the procedural texturing pipeline.

FIG. 4a shows an example of the generation of a synthetic bright field image of H&E-stained muscle fiber sections according to the method of the present invention, starting from a base image data set (BBD) via a pipeline of here only a few conversion nodes (K1 to K7) to a final image data set (EBD).

In this example, the base image data set (BBD) is a Voronoi diagram, which contains image data and coordinate data of basic structures of a muscle fiber section, whereby the brightness of the pixels represents their respective distance from an outer boundary of the respective Voronoi region to the starting point (seed) of this region. The greater the distance to the starting point, the brighter the color assigned to the pixel. In the case of the basic structure of a muscle fiber section, the starting points of the Voronoi are representative of the positions of the cell centers, which can also represent the positions of the cell nuclei, and the outer boundaries of the respective Voronoi regions are representative of the fiber boundaries of the muscle cells. Each image point is thus already linked in the base image data set, as well as in the subsequent image data sets generated at the conversion nodes, with information about its position in two-dimensional space, its color and its class assignment (e.g. cell nucleus, fiber boundary, etc.). This image and coordinate data can be changed at the conversion nodes by the parametric algorithm used.

At the conversion node K1 in this example, the underlying parametric algorithm first generates a subsequent image data set based on the information (position, class) assigned to each individual image point in the two-dimensional space of the Voronoi diagram, in which the Voronoi regions representing the muscle fibers in the cross-section are delineated in light in contrast to fiber boundaries and intercellular areas in dark, analogous to a binary segmentation mask.

The resulting subsequent image data set is superimposed at conversion node K2 with image and coordinate data of a section of a Voronoi structure generated using a further parametric algorithm, which typically represents coarse connective tissue structures (perimysium) visible in muscle cell sections. The resulting subsequent image data set is similarly overlaid at conversion node K3 with image and coordinate data of a Voronoi structure, which also represents somewhat finer connective tissue structures visible in muscle cell sections. The subsequent image data sets generated at the conversion nodes K2 and K3 now also contain image points whose image and coordinate data are linked with the information that they are assigned to the class of the corresponding connective tissue structures and no longer to the class that was previously assigned to the image point at the same location.

At conversion node K4 in the previously generated subsequent image data set, the pixels that are assigned to the class of fiber cross-sections based on their image and coordinate data are assigned color values based on a superimposition of simple noise patterns with color values. Noise patterns and color values are also subject to parametric variability within ranges, as can typically occur when staining the cells during the preparation of tissue sections.

At conversion node K5 in the previously generated subsequent image data set, analogous to conversion node K4, the image points that are not assigned to the class of fiber cross-sections based on their image and coordinate data, but to the class of connective tissue and intercellular spaces, are now overlaid with image data that corresponds to frequently observed backgrounds in real sectional images, e.g. tissue fragments, etc. The data for the background is in turn generated using a parametric algorithm, so that different possible appearances can also be generated in this respect within variable parameter values.

At the conversion node K6, additional fiber artifacts (e.g. cutting artifacts, tears in the fibers, etc.) are added in a similar way only to image points of the fiber cross-section class, as they occur, for example, during the preparation of the samples. Image points of the connective tissue class and the intercellular spaces are excluded from this.

Finally, cell nuclei of the connective tissue that typically appear in such tissue sections are added at conversion node K7, thus generating the final image data set (EBD), which represents only one of almost infinitely many possible manifestations of photorealistic microscopic images of muscle fiber sections with realistic simulation of fibers, artifacts, connective tissue and cell nuclei due to the parameterization work of the algorithms at the individual conversion nodes.

FIG. 4b shows an example of three different, in this case binary segmentation masks as possible sample solutions of different classes of the final image data set (EBD) from FIG. 4a. In the first segmentation mask (i), the muscle fibers in cross-section are highlighted in white, while intercellular spaces and connective tissue structures are shown in black as a background. In an alternative segmentation mask (ii), only the coarse connective tissue is highlighted in white, and the further alternative segmentation mask (iii) is directed towards the marking of the cell nuclei. The generation of the different segmentation masks (classification) is based on the image and coordinate data assigned to each pixel of the final image data set, including class membership.

The present invention thus overcomes the tedious, costly and error-prone process of collecting and annotating real data. The invention also solves the above described drawbacks of using GANs to generate photorealistic synthetic biomedical images. The present invention is suitable for generating photorealistic training images and associated sample solutions in a very controllable, effective and less error-prone manner, which can be used as training data for prior art AI systems.

The method according to the invention can be easily implemented on known computer graphics programs. A suitable prior art computer graphics program is the software Blender, a free and open image design software (www.blender.org), but other programs can also be used, such as Houdini from SideFX (www.sidefx.com) or Substance Designer from Adobe.

The systems and devices described herein may include a controller or a computing device comprising a processing and a memory which has stored therein computer-executable instructions for implementing the processes described herein. The processing unit may comprise any suitable devices configured to cause a series of steps to be performed so as to implement the method such that instructions, when executed by the computing device or other programmable apparatus, may cause the functions/acts/steps specified in the methods described herein to be executed. The processing unit may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory may be any suitable known or other machine-readable storage medium. The memory may comprise non-transitory computer readable storage medium such as, for example, but not limited to, an electronic, magnetic, optical, electromagnetic, infrared, or semiconductor system, apparatus, or device, or any suitable combination of the foregoing. The memory may include a suitable combination of any type of computer memory that is located either internally or externally to the device such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. The memory may comprise any storage means (e.g., devices) suitable for retrievably storing the computer-executable instructions executable by processing unit.

The methods and systems described herein may be implemented in a high-level procedural or object-oriented programming or scripting language, or a combination thereof, to communicate with or assist in the operation of the controller or computing device. Alternatively, the methods and systems described herein may be implemented in assembly or machine language. The language may be a compiled or interpreted language. Program code for implementing the methods and systems described herein may be stored on the storage media or the device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein.

Computer-executable instructions may be in many forms, including modules, executed by one or more computers or other devices. Generally, modules include routines, programs, objects, components, data structures, etc., that perform particular tasks or implement particular abstract data types. Typically, the functionality of the modules may be combined or distributed as desired in various embodiments.

It will be appreciated that the systems and devices and components thereof may utilize communication through any of various network protocols such as TCP/IP, Ethernet, FTP, HTTP and the like, and/or through various wireless communication technologies such as GSM, CDMA, Wi-Fi, and WiMAX, is and the various computing devices described herein may be configured to communicate using any of these network protocols or technologies.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A computer-implemented method for generating synthetic images representing microscopic images of a biological material and, for each synthetic image, at least one sample solution for training an artificial intelligence (AI) comprising the steps of:

using algorithms to generate or provide a two-dimensional base image data set using simulative methods, which comprises image data and coordinate data of basic structures of biological material, each pixel in the image data and the coordinate data of the two-dimensional base image data set being linked to information about a respective position in two-dimensional space, a respective color and a respective class assignment, feeding the two-dimensional base image base data set to a pipeline of conversion nodes, each conversion node comprising a parametric algorithm configured to generate a subsequent image data set by procedural generation, wherein at least one feature of the base two-dimensional image data set fed to the parametric algorithm is changed or added by converting the image data, the coordinate data, or both, whereby pixels receives new color information, or new coordinate data, or new class assignment, or any combination thereof, wherein each parametric algorithm comprises at least one parameter configured to be varied within a range of values in order to control a change of the at least one feature in the two-dimensional image base data set during a conversion of the image data, the coordinate data, or both, wherein, starting from the two-dimensional base image data set, each subsequent image data set in the pipeline of conversion nodes is sequentially fed to further conversion nodes in order to generate a final image data set which represents a synthetic image of a microscopic image of a biological material, and, generating at least one sample solution with at least one further algorithm for the final image data set or a subsequent image data set preceding the final image data set in the pipeline of conversion nodes.

2. The computer-implemented method according to claim 1, wherein the at least one sample solution is a segmentation mask.

3. The computer-implemented method according to claim 1, wherein, in order to generate a plurality of mutually different synthetic images and associated sample solutions, the computer-implemented method is carried out several times from the supply of the two-dimensional base image data set to the pipeline of conversion nodes until the final image data set is obtained, while changing the parameters of the parametric algorithms at the conversion nodes.

4. The computer-implemented method according to claim 1, wherein, in order to generate a plurality of mutually different synthetic images and associated sample solutions, at least one subsequent image data set generated in the pipeline of conversion nodes is stored in an intermediate data memory and then repeatedly added to further conversion nodes, which are arranged in the pipeline of conversion nodes downstream of the conversion node at which the subsequent image data set stored in the intermediate data memory was generated, by changing the parameters of the parametric algorithms at these conversion nodes.

5. The computer-implemented method according to claim 1, wherein the microscopic image of biological material is a biological material comprising cells.

6. The computer-implemented method according to claim 5, wherein the microscopic image of biological material is a tissue section, a smear, or a cell culture.

7. The computer-implemented method according to claim 1, wherein the two-dimensional base image data set comprises the image data and coordinates of a Voronoi diagram.

8. A non-transitory computer readable media comprising:
   a computer program comprising instructions for implementing the computer-implemented method according to claim 1.

* * * * *